(12) United States Patent
Herman

(10) Patent No.: US 8,185,256 B2
(45) Date of Patent: May 22, 2012

(54) THREAT PRIORITIZATION USING ENGAGEMENT TIMELINE

(75) Inventor: Carl R. Herman, Owego, NY (US)

(73) Assignee: Lockheed Martin Corporation, Bethesda, MD (US)

(*) Notice: Subject to any disclaimer, the term of this patent is extended or adjusted under 35 U.S.C. 154(b) by 1032 days.

(21) Appl. No.: 12/108,368

(22) Filed: Apr. 23, 2008

(65) Prior Publication Data

US 2009/0322584 A1 Dec. 31, 2009

(51) Int. Cl.
*G01C 23/00* (2006.01)
(52) U.S. Cl. ............... 701/3; 701/200; 342/13; 342/17; 726/22; 726/23; 726/24; 726/25
(58) Field of Classification Search ............. 726/22–25; 342/13, 17; 701/3, 200
See application file for complete search history.

(56) References Cited

U.S. PATENT DOCUMENTS

| 4,424,038 | A | 1/1984 | Tingleff et al. |
|---|---|---|---|
| 4,760,396 | A | 7/1988 | Barney et al. |
| 4,797,839 | A | 1/1989 | Powell |
| 4,812,990 | A | 3/1989 | Adams et al. |
| 4,947,350 | A | 8/1990 | Murray et al. |
| 4,959,015 | A | 9/1990 | Rasinski et al. |
| 5,404,516 | A | 4/1995 | Georgiades et al. |
| 5,421,728 | A | 6/1995 | Milden |
| 5,458,041 | A | 10/1995 | Sun et al. |
| 5,508,928 | A | 4/1996 | Tran |
| 5,572,213 | A | 11/1996 | Noneman et al. |
| 5,635,662 | A | 6/1997 | Robertson et al. |
| 5,787,333 | A | 7/1998 | Rasinski et al. |
| 5,838,262 | A | 11/1998 | Kershner et al. |
| 5,844,602 | A | 12/1998 | Lareau et al. |
| 5,883,586 | A | 3/1999 | Tran et al. |
| 5,969,676 | A | 10/1999 | Tran et al. |
| 5,992,288 | A | 11/1999 | Barnes |
| 6,199,470 | B1 | 3/2001 | Dewan et al. |
| 6,222,464 | B1 | 4/2001 | Tinkel et al. |

(Continued)

FOREIGN PATENT DOCUMENTS

JP 2002195795 A 7/2002

OTHER PUBLICATIONS

Monte Carlo Method from Wikipedia Oct. 3, 2006, 6 pages.

*Primary Examiner* — Thomas Black
*Assistant Examiner* — Luke Huynh
(74) *Attorney, Agent, or Firm* — Miles & Stockbridge P.C.

(57) ABSTRACT

A method for prioritizing threats to an aircraft is disclosed. The method can include providing threat attribute information including a threat engagement timeline and a threat lethality metric and obtaining a threat track indication that indicates a threat is tracking the aircraft. The method can also include determining a historical position estimate of the aircraft at which the threat track began, a time estimate at which the threat track began and determining a period of time during which the threat track has been possible. The method can also include determining a time to engagement based on the threat attribute information and the time period and calculating a priority value for the threat based on the time to engagement and the threat lethality metric. The method can include outputting a prioritized threat list including the priority value calculated for the threat.

20 Claims, 5 Drawing Sheets

U.S. PATENT DOCUMENTS

| | | |
|---|---|---|
| 6,231,003 B1 | 5/2001 | Hibma et al. |
| 6,267,039 B1 | 7/2001 | Czarnecki |
| 6,497,169 B1 | 12/2002 | Khosla |
| 6,771,205 B1 | 8/2004 | Barton et al. |
| 6,806,828 B1 | 10/2004 | Sparrow et al. |
| 6,995,660 B2 * | 2/2006 | Yannone et al. ........... 340/425.5 |
| 2002/0150866 A1 | 10/2002 | Perry et al. |
| 2003/0019350 A1 | 1/2003 | Khosla |
| 2003/0142005 A1 | 7/2003 | Bar-Avi et al. |
| 2003/0205126 A1 | 11/2003 | O'Neill |
| 2003/0215771 A1 | 11/2003 | Bartoldus et al. |
| 2004/0030463 A1 | 2/2004 | Stockdale et al. |
| 2005/0038628 A1 | 2/2005 | Beuttel et al. |
| 2005/0073439 A1 | 4/2005 | Perricone |
| 2005/0256682 A1 | 11/2005 | Galutia et al. |
| 2006/0000988 A1 | 1/2006 | Stuart et al. |

* cited by examiner

THREAT PRIORITIZATION USING ENGAGEMENT TIMELINE

Embodiments of the present invention relate generally to prioritizing threats, and more particularly to prioritizing threats using threat attribute information including an engagement timeline and/or lethality.

Determining the priority of each threat in a group of multiple threats may be one of the most important tasks for a pilot operating in a battlefield or combat environment. Quickly identifying which threat(s) pose the most imminent risk can be a significant factor in survivability.

Embodiments of the present invention provide a threat prioritization method, system and software for prioritizing threats using any available information. For example, threats can be prioritized using attributes of each threat including a threat engagement timeline and/or lethality. Thus, embodiments can take into account an effectiveness of a threat weapon system as well as how close (in time) the threat is to using the weapon system against the aircraft.

An embodiment can include a method for prioritizing threats. The method can include providing threat attribute information including a threat engagement timeline and a threat lethality. The method can also include obtaining a threat track indication and determining a historical position at which the threat may have began tracking. Using a determined or estimated time that track may have started, a position along the threat's engagement timeline can be determined. A priority index can be calculated for the threat based on threat engagement timeline position and threat lethality.

An embodiment can include a method for prioritizing threats to an aircraft. The method can include providing threat attribute information including a threat engagement timeline and a threat lethality metric and obtaining a threat track indication that indicates a threat is tracking the aircraft. The method can also include determining a historical position of the aircraft at which the threat track began and a time that the threat track began and determining a time period during which the threat track has been possible. The method can also include determining a time to engagement based on the threat attribute information and the time period and calculating a priority value for the threat based on the time to engagement and the threat lethality metric. The method can include outputting a prioritized threat list including the priority value calculated for the threat.

Another embodiment can include a computer system for prioritizing threats to an aircraft. The computer system can include a threat prioritization module and a memory including software instructions adapted to cause the computer system to perform a series of steps. The steps can include providing threat attribute information including a threat engagement timeline to the threat prioritization module and obtaining a threat track indication that indicates a threat is tracking the aircraft. The steps can also include determining a historical position of the aircraft at which the threat track began and a time that the threat track began and determining a time period during which the threat track has been possible. The steps can also include determining a time to engagement based on the threat attribute information and the time period and calculating, using the threat prioritization module, a priority value for the threat based on the time to engagement. The steps can also include outputting, from the threat prioritization module, a prioritized threat list including the priority value calculated for the threat.

Another embodiment can include a computer readable medium encoded with software instructions for prioritizing threats that, when executed by a computer, cause the computer to perform a series of steps. The steps can include providing threat attribute information including a threat engagement timeline and obtaining a threat track indication. The steps can also include determining a time to engagement based on the threat engagement timeline and a length of time the threat track has been active and calculating a priority value for the threat based on the time to engagement. The steps can also include outputting a prioritized threat list including the priority value calculated for the threat.

While aircraft and rotorcraft are used as examples in this application for illustration purposes, it should be appreciated that the methods, systems and software of various embodiments can be used with military vehicles, spacecraft, commercial vehicles, private vehicles, unmanned aircraft and vehicles, autonomous machines or vehicles, and/or any type of machine or vehicle where a determination of survivability may be useful or desired. Vehicles, as used herein, is intended to refer to any type of transportation apparatus including, but not limited to, airplanes, helicopters, rockets, missiles, gliders, lighter-than-air craft, unmanned aerial vehicles (UAVs), cars, trucks, motorcycles, tanks, military ground transports, heavy equipment, naval vessels, watercraft, submarines, hover craft, human powered vehicles, and/or the like.

DETAILED DESCRIPTION

Figure 1:
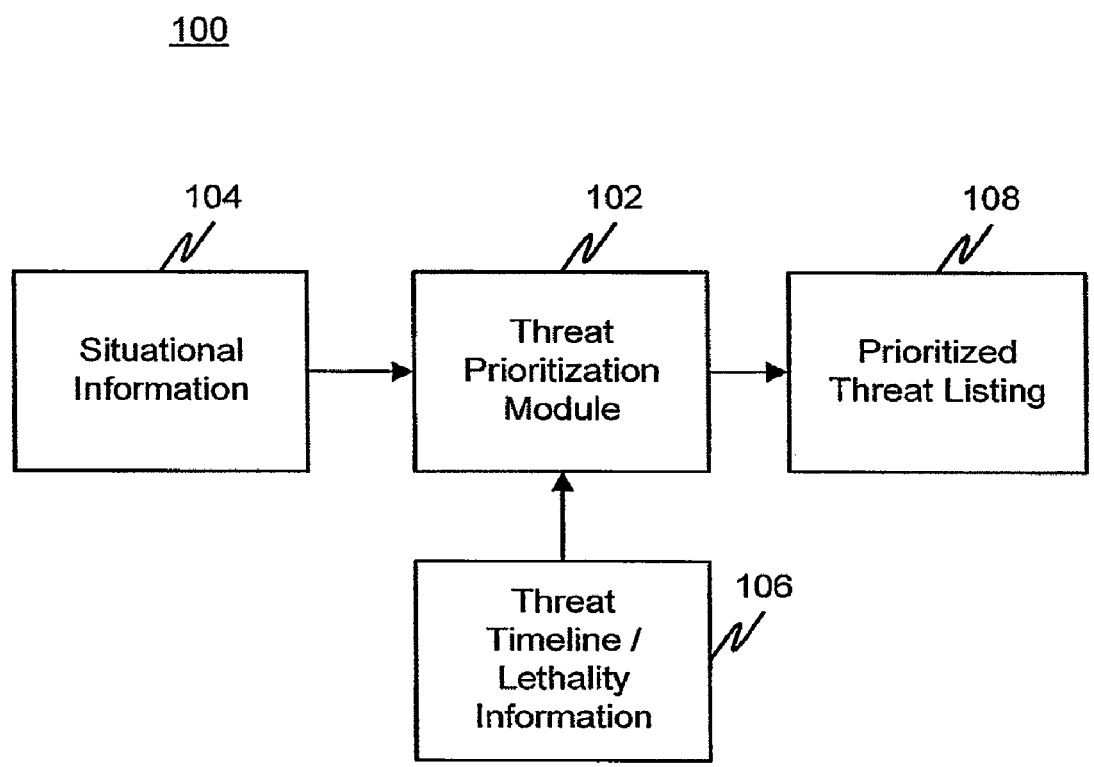
FIG. 1 is a block diagram showing an exemplary embodiment of a system for prioritizing threats.

FIG. 1 shows an exemplary threat prioritization system 100. The system 100 includes a threat prioritization module 102. The threat prioritization module 102 can receive, as input, situational information 104 and threat timeline/lethality information 106. The threat prioritization module 102 can provide a prioritized threat listing 108 as output.

The situational information 104 can include, for example, such information as threat track indications, historical ownship position information, threat position information, and/or the like. The threat timeline/lethality information 106 can include attributes of various threats that may be encountered, such as, for example, an engagement timeline for each threat, a lethality of each threat, and/or the like. Other information relevant to a threat prioritization task may be included in the situational information 104 and/or the threat timeline/lethality information 106 (threat attribute information). For example, threat timeline/lethality information can include threat location, threat location error, a specific threat, a threat type, a threat class, or the like. As an alternative or supplement to actual threat information, statistical threat information may be used. For example, if all that is known is that a threat is a wheeled vehicle, then the statistically worst (e.g., most dangerous) wheeled vehicle threat information can be used.

In operation, the threat prioritization module 102 can determine a priority of a threat. The priority of a threat ($P_T$) can be expressed as $P_T = P_{K/S}/\text{TTE}$, where $P_{K/S}$ represents a weapon system lethality metric and TTE represents the amount of time remaining until the weapon system can fire a shot (e.g., time to engagement), for example. The weapons system lethality metric can be a probability that a shot from the weapon system results in a kill. The lethality metric can be based on a shot resulting in a kill (i.e., catastrophic), or on some other level of lethality such as, for example, emergency, loss of capability, or other level of lethality.

The phrase "determining" as used herein can include determining based on known, measured, sensed or predicted information, and is also used to mean determining an estimate of a value in cases where the actual information may not be available. For example, determining when a threat track began can include estimating when a threat track was first possible and using that time as an estimate of when the threat track began. From the vantage point of ownship, there is likely little or no certainty as to where a particular threat is along its engagement timeline, and therefore a determination of any value related to that timeline may include estimation. Estimation may be made in a variety of ways based on a number of factors, such as worst case estimates to maximize safety, or estimates may be weighted to increase or decrease the importance of a factor relative to an overall mission or objective.

The priority of a threat can be modified using an adjustable safety factor applied to the TTE. For example, subtracting an amount of time from TTE would provide an additional margin of safety because the threat priority would be elevated according to the size of the safety factor relative to the other factors in the equation. On the other hand, in another example, the TTE may be increased by the safety factor, in which case priority of the threat may be lowered. This could be used, for example, where a lowering of the threat priority may be appropriate when other information or priorities for a mission are taken into account. Any adjustment of the TTE can be bounded to prevent a divide by zero error from occurring.

Also, a scaling factor can be applied to the denominator of the threat priority equation. The scaling factor can be applied with or without an adjustable safety factor. The scaling factor can be a multiplicative factor applied to TTE (along with the safety factor, if used). The scaling factor can affect how the denominator approaches zero, while the safety factor can affect when the denominator reaches zero. For example, a threat priority may need to be lowered numerically via the scaling factor to achieve a mission objective. The safety factor and the scaling factor provide adjustment points for a threat's priority in accordance with, for example, mission-level priorities and/or importance of mission objectives.

The weapon system lethality metric ($P_{K/S}$) can be expressed as: $P_{K/S} = P_{H/S} \times P_{K/H}$, where $P_{H/S}$ is a probability of a hit given a shot and $P_{K/H}$ is a probability of a kill given a hit. The probability of a hit given a shot can be a function of range, aspect (i.e., orientation of the aircraft), or the like. The probability of a kill given a hit can also be a function of aspect.

Once new or existing threats have been prioritized by the threat prioritization module 102, a prioritized threat listing 108 can be output. The prioritized threat listing can contain some or all of the threats currently being processed. This output may be in a human readable form (e.g., a list displayed on an avionics display for a pilot to view), or in computer readable form (e.g., a list provided to an onboard mission management computer), or both. In addition to a visually readable output list, a portion of the prioritized threat listing may be provided as a visual or auditory alert indication (e.g., a cue can be provided to the pilot for a threat that is within a predetermined threshold time of engaging).

Figure 2:
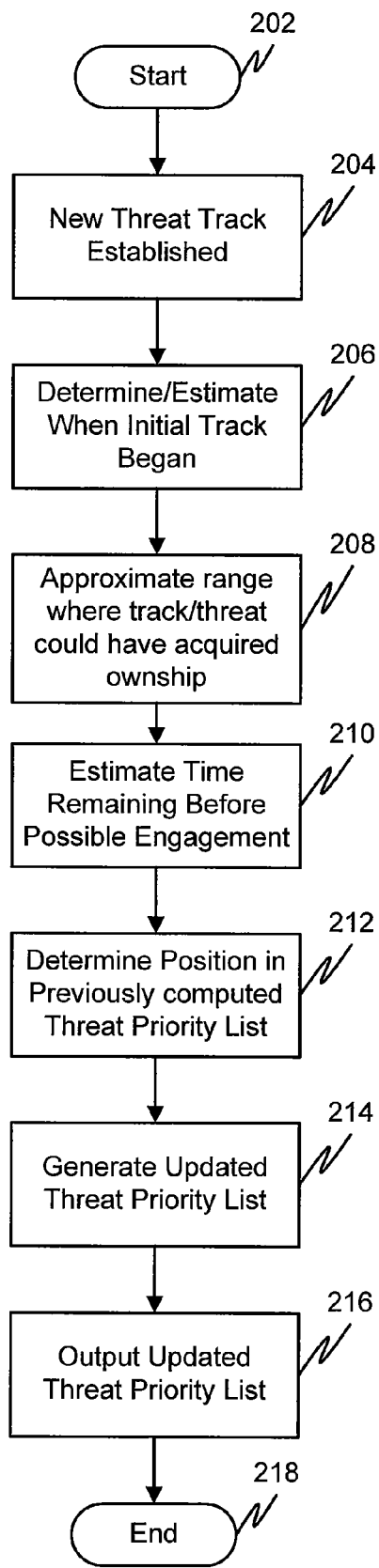
FIG. 2 is a flowchart showing an exemplary embodiment of a method for prioritizing threats, including adding a new threat to a prioritized list of threats.

FIG. 2 is a flowchart showing an exemplary embodiment of a method for prioritizing threats, including adding a new threat to a prioritized list of threats. Processing begins at step 202 and continues to step 204.

In step 204, a new threat track is established. The threat track can be established based on sensed data, received data, and/or stored data. Sensed data can include, for example, a detection that a weapon system sensor has illuminated or energized the aircraft, and the aircraft may now be visible to the weapon system (e.g., a radar signal has been detected). Received data can include, for example, an indication from an external system that a threat track may be established. Stored data can include, for example, historical information indicating that threat tracks may have been started in this location in the past. Processing continues to step 206.

In step 206, a determination or estimation is made of when the threat track may have begun. This determination or estimation can be made using historical flight path information and knowledge of a threat's ability. Using these pieces of information it can be determined or estimated when the aircraft entered the threat's range within its ability. The determination can also be made using the actual data from a signal received from the threat. Processing continues to step 208.

In step 208, an approximation of the range where track/threat could have acquired ownship is determined. This can provide an indication of the amount of time elapsed since the estimated time the track began, as used below in step 210.

In step 210, using the determined/estimated track start time/location and the historical aircraft track since track start, a time before engagement can be determined (i.e., TTE). Processing continues to step 212.

In step 212, using the lethality metric for the new threat and the TTE as determined above, a threat priority for the new threat can be determined and the position of the new threat in the threat priority list can also be determined. Processing continues to step 214.

In step 214, an updated threat priority list is generated. The threat priority list can be ordered from most imminent threat to least. Processing continues to step 216.

In step 216, the updated threat priority list can be outputted, as described above in reference to the prioritized threat listing 108 of FIG. 1. Processing then continues to step 218, where processing ends. It should be appreciated that the above steps may be repeated in whole or in part to accomplish a threat prioritization task in accordance with the embodiment.

Figure 3:
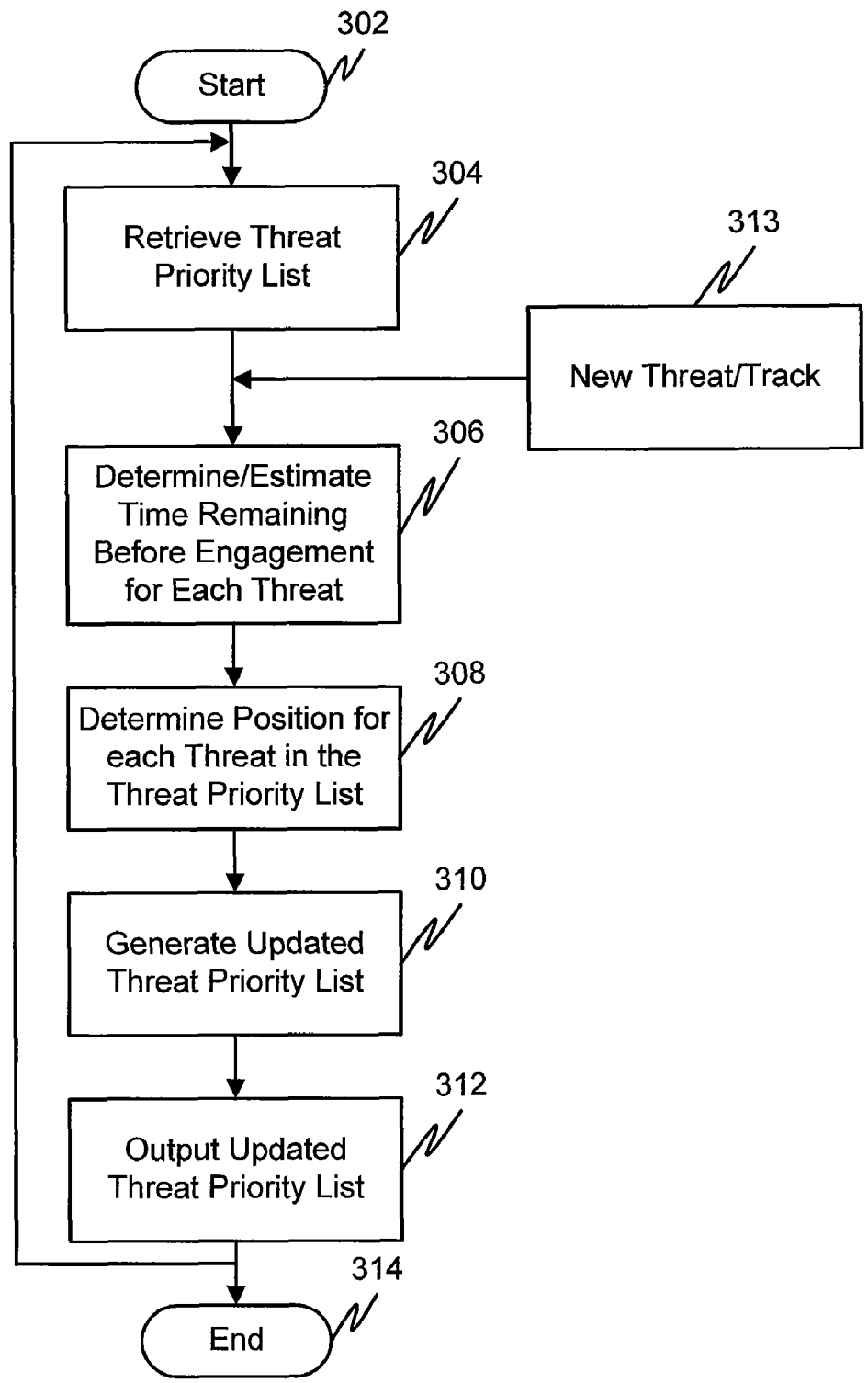
FIG. 3 is a flowchart showing an exemplary embodiment of a method for prioritizing threats.

FIG. 3 is a flowchart showing an exemplary embodiment of a method for prioritizing threats. Processing begins at step 302 and continues to step 304.

In step 304, a prioritized threat list is retrieved. This list can be retrieved from a computer memory, storage device, received via communication, or from any suitable source. Processing continues to step 306.

In step 306, the time to engagement (TTE) for each threat in the list is determined. Processing continues to step 308.

In step 308, using the updated TTE values for each threat, an updated priority can be determined for each threat. The prioritized threat list can then be re-ordered according to the updated threat priorities. Processing continues to step 310.

In step 310, an updated threat priority list is generated. The threat priority list can be ordered from most imminent threat to least. Processing continues to step 312.

In step 312, the updated threat priority list can be outputted, as described above in reference to the prioritized threat listing 108 of FIG. 1. Processing then continues to step 314, where processing ends. It should be appreciated that the above steps may be repeated in whole or in part to accomplish a threat prioritization task in accordance with the embodiment. For example, a new threat track 313 may be determined or estimated. By repeating steps 304-312, the new threat 313 can be considered in the prioritized list of threats. Further, once a threat is no longer a factor, for example due to position of ownship or threat, or neutralization of the threat, the threat can be removed from the prioritized threat list.

Figure 4:
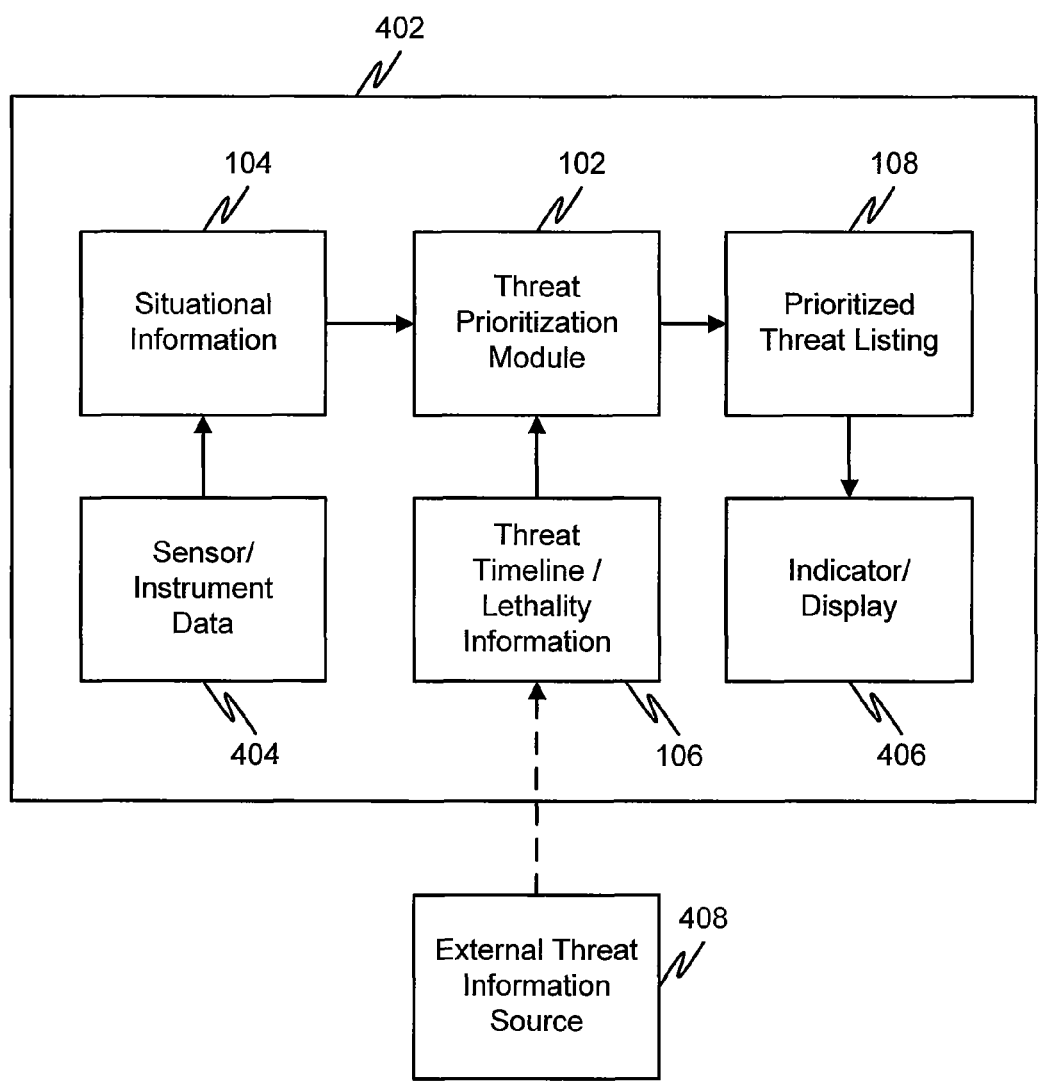
FIG. 4 is a block diagram of an exemplary system for prioritizing threats including an external source of threat information.

FIG. 4 shows an exemplary system for prioritizing threats including an external source of threat information. In particular, an aircraft 402 includes a threat prioritization module 102, situational information 104, threat timeline/lethality information 106, a prioritized threat listing 108, sensor/instrument data 404, and an indicator/display 406. Also, an external threat information source 408 is shown.

In operation, the sensor/instrument data 404 may provide some or all of the situational information 104 that is used as input to the threat prioritization module 102. Threat timeline/lethality information 106 may be received from the external threat information source 408. The external threat information source 408 can include, for example, another aircraft, a ground station, a satellite, or other any suitable source of threat information. The threat timeline/lethality information 106 can include other information as described above. The threat/timeline information 106 is also provided as input to the threat prioritization module 102.

The threat prioritization module 102 determines the priority for each threat and outputs a prioritized threat listing 108. The prioritized threat listing may be indicated and/or displayed on indicator/display 406. The prioritized threat listing 108 may also be transmitted to an onboard system, for example a mission management system, or to an offboard system such as a ground station, other aircraft, satellite, or the like.

Figure 5:
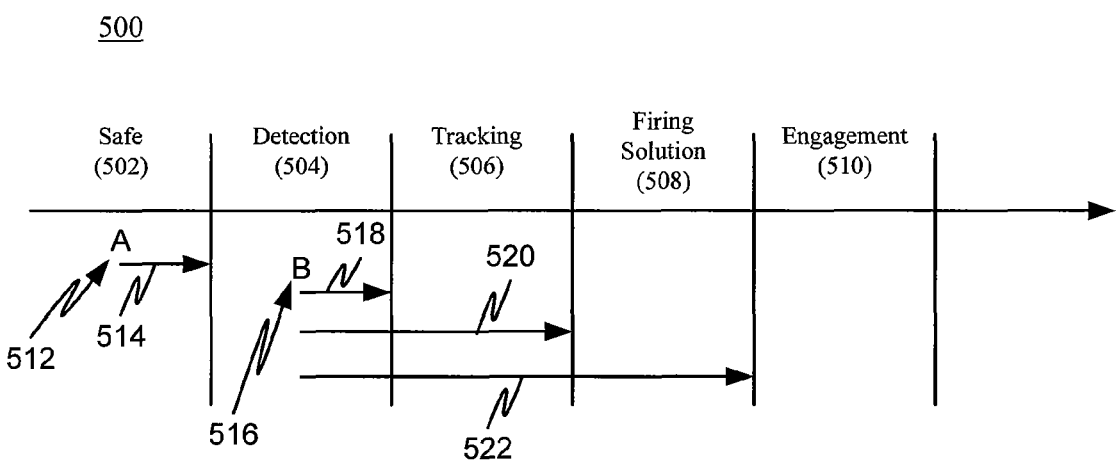
FIG. 5 is a diagrammatic illustration of an exemplary threat timeline showing two examples of a position along the threat timeline.

FIG. 5 is a diagrammatic illustration of an exemplary threat timeline 500. Threat timeline 500 includes a safe period 502 that is prior to detection, a detection phase 504, a tracking phase 506, firing solution phase 508, and an engagement phase 510. It should be appreciated that the phases shown are for illustration purposes only, and an actual threat may include a timeline have more or less phases of the same or different types as shown in FIG. 5.

In a first example, an aircraft is at position A (512) on the threat timeline 500. The aircraft at position A is in the safe period 502 and has a time period 514 before entering the detection phase 504.

In a second example, an aircraft is at position B (516) on the threat timeline 500.

This aircraft has entered the detection phase 504. There is a time period 518 before tracking begins, a time period 520 before firing solution begins, and a time period 522 before engagement. Thus, for the aircraft at position B, the TTE would be the time period 522.

Although the threat priority computation has been described above in relation to the time to engagement (TTE), it should be appreciated that the threat priority can be based on another measure such as time to detection or time to tracking, for example. Also, it should be appreciated that different threat types may have their respective priorities determined differently based. For example, it may be more relevant or important, for a certain threat type, to determine its priority based on time to detection, whereas for another threat type the time to engagement may be a more relevant metric.

While aircraft have been used as examples in this application for illustration purposes, it should be appreciated that the methods, systems and software of various embodiments can be used with rotorcraft, military vehicles, spacecraft, commercial vehicles, private vehicles, unmanned aircraft and vehicles, autonomous machines or vehicles, and/or any type of machine or vehicle where a determination of survivability may be useful or desired. Vehicles, as used herein, is intended to refer to any type of transportation apparatus including, but not limited to, airplanes, helicopters, rockets, missiles, gliders, lighter-than-air craft, unmanned aerial vehicles (UAVs), cars, trucks, motorcycles, tanks, military ground transports, heavy equipment, naval vessels, watercraft, submarines, hover craft, human powered vehicles, and/or the like.

Also, while the invention has been described with respect to threats in a military or combats sense, it should be appreciated that embodiments of the invention could be applied to non-military applications, such as commercial or private vehicle navigation or operation, police vehicle operations, homeland security operations, or any other application where a prioritized list of threats may be desired. Also, while "threat" has been used to describe the exemplary embodiments for illustration purposes, it should be appreciated that a threat may encompass something different than a weapon system intended to kill an aircraft. A threat can include any entity where a desire to prioritize that entity relative to another entity may exist or be suitable. Also, the engagement timeline may be different in non-military embodiments and may include more or less phases and the phases may be of different types than a weapon engagement timeline.

It should be appreciated that any steps described above may be repeated in whole or in part in order to perform a contemplated threat prioritization task. Further, it should be appreciated that the steps mentioned above may be performed on a single or distributed processor. Also, the processes, modules, and units described in the various figures of the embodiments above may be distributed across multiple computers or systems or may be co-located in a single processor or system.

Embodiments of the method, system and computer program for threat prioritization using an engagement timeline, may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic device such as a PLD, PLA, FPGA, PAL, or the like. In general, any process capable of implementing the functions or steps described herein can be used to implement embodiments of the method, system, or computer program for threat prioritization using an engagement timeline.

Furthermore, embodiments of the disclosed method, system, and computer program for threat prioritization using an engagement timeline may be readily implemented, fully or partially, in software using, for example, object or object-oriented software development environments that provide portable source code that can be used on a variety of computer platforms. Alternatively, embodiments of the disclosed method, system, and computer program for threat prioritization using an engagement timeline can be implemented partially or fully in hardware using, for example, standard logic circuits or a VLSI design. Other hardware or software can be used to implement embodiments depending on the speed and/or efficiency requirements of the systems, the particular function, and/or a particular software or hardware system, microprocessor, or microcomputer system being utilized. Embodiments of the method, system, and computer program for threat prioritization using an engagement timeline can be implemented in hardware and/or software using any known or later developed systems or structures, devices and/or software by those of ordinary skill in the applicable art from the functional description provided herein and with a general basic knowledge of the computer and/or simulation arts.

Moreover, embodiments of the disclosed method, system, and computer program for threat prioritization using an engagement timeline can be implemented in software executed on a programmed general-purpose computer, a special purpose computer, a microprocessor, or the like. Also, the threat prioritization using an engagement timeline method of this invention can be implemented as a program embedded on a personal computer such as a JAVA® or CGI script, as a resource residing on a server or graphics workstation, as a routine embedded in a dedicated processing system, or the like. The method and system can also be implemented by physically incorporating the method for threat prioritization using an engagement timeline into a software and/or hardware system. For example, the hardware and/or software systems of an avionics system.

It is, therefore, apparent that there is provided in accordance with the present invention, a method, system, and computer program for threat prioritization using an engagement timeline. While this invention has been described in conjunction with a number of embodiments, it is evident that many alternatives, modifications and variations would be or are apparent to those of ordinary skill in the applicable arts. Accordingly, applicants intend to embrace all such alternatives, modifications, equivalents and variations that are within the spirit and scope of this invention.

The invention claimed is:

1. A method for prioritizing threats to an aircraft comprising:
providing threat attribute information including a threat engagement timeline and a threat lethality metric, the threat engagement timeline having a detection period during which a threat can detect the aircraft before the threat engages the aircraft, a tracking period following the detection period during which the threat can track the aircraft prior to engagement, a firing solution period following the tracking period during which the threat can compute a firing solution to engage the aircraft, and an engagement period during which the threat can engage the aircraft;
obtaining a threat track indication that indicates a threat is tracking the aircraft;
determining a historical position estimate of the aircraft at which the threat track began and a time estimate that the threat track began;
determining a time period during which the threat track has been possible according to said detection period of the attribute information;
determining a time to engagement estimate based on said threat engagement timeline of the threat attribute information and on the time period determined by said determining a time period determined by said determining a time to engagement;
calculating a priority value for the threat based on the time to engagement and the threat lethality metric; and
outputting a prioritized threat list including the priority value calculated for the threat, the prioritized threat list including the threat in a position indicating priority compared to other threats on the threat list.

2. The method of claim 1, wherein the threat attribute information is received on board the aircraft from a source external to the aircraft.

3. The method of claim 1, wherein the threat lethality metric includes a probability that a shot from a weapon system of the threat would result in a kill of the aircraft.

4. The method of claim 1, wherein the step of outputting the prioritized threat list includes providing an indication to a crew member of the aircraft.

5. The method of claim 1, wherein the step of outputting the prioritized threat list includes providing the prioritized list to another system onboard the aircraft.

6. The method of claim 1, wherein the aircraft is a helicopter.

7. A computer system for prioritizing threats to an aircraft, said computer system comprising:
a threat prioritization module; and
a memory including software instructions adapted to cause the computer system to perform steps including:
providing threat attribute information including a threat engagement timeline to the threat prioritization module, the threat engagement timeline having a detection period, a tracking period, a firing solution period and an engagement period;
obtaining a threat track indication that indicates a threat is tracking the aircraft;
determining a historical position estimate of the aircraft at which the threat track began and a time estimate that the threat track began;
determining a time period during which the threat track has been possible;
determining a time to engagement estimate based on the threat attribute information and the time period;
calculating, using the threat prioritization module, a priority value for the threat based on the time to engagement estimate; and
outputting, from the threat prioritization module, a prioritized threat list including the priority value calculated for the threat.

8. The computer system of claim 7, wherein the threat attribute information includes a threat lethality metric.

9. The computer system of claim 8, wherein the step of calculating the priority value is based on the threat lethality metric.

10. The computer system of claim 8, wherein the threat lethality metric includes a probability that a shot from a weapon system of the threat would result in a kill of the aircraft.

11. The computer system of claim 7, wherein the step of outputting the prioritized threat list includes providing an indication to a crew member of the aircraft.

12. The computer system of claim 7, wherein the step of outputting the prioritized threat list includes providing the prioritized list to another system onboard the aircraft.

13. A computer readable medium encoded with software instructions for prioritizing threats that, when executed by a computer, cause the computer to perform a series of steps comprising:
providing threat attribute information including a threat engagement timeline, the threat engagement timeline having a detection period, a tracking period, a firing solution period and an engagement period;
obtaining a threat track indication;
determining a time to engagement estimate based on the threat engagement timeline and a length of time the threat track has been estimated to be active;
calculating a priority value for the threat based on the time to engagement estimate; and
outputting a prioritized threat list including the priority value calculated for the threat.

14. The computer readable medium of claim 13, wherein the threat attribute information includes a threat lethality metric.

15. The computer readable medium of claim 14, wherein the step of calculating the priority value is based on the threat lethality metric.

16. The computer readable medium of claim 14, wherein the threat lethality metric includes a probability that a shot from a weapon system of the threat would result in a kill of an aircraft that contains the software.

17. The computer readable medium of claim 13, wherein the steps further include determining a historical position estimate at which the threat track began and a time estimate that the threat track began.

18. The computer readable medium of claim 13, wherein the steps further include determining a time period during which the threat track has been possible.

19. The computer readable medium of claim 13, wherein the software is adapted for use on an aircraft.

20. The computer readable medium of claim 13, wherein the threat attribute information is received from an external source.

* * * * *